(12) United States Patent
Schreckenberg

(10) Patent No.: US 10,504,084 B2
(45) Date of Patent: Dec. 10, 2019

(54) CASH BOX AND AUTOMATED TELLER MACHINE

(71) Applicant: WINCOR NIXDORF INTERNATIONAL GMBH, Paderborn (DE)

(72) Inventor: Andreas Schreckenberg, Singapore (SG)

(73) Assignee: Wincor Nixdorf International, GmbH, Paderborn (DE)

( * ) Notice: Subject to any disclaimer, the term of this patent is extended or adjusted under 35 U.S.C. 154(b) by 0 days.

(21) Appl. No.: 15/100,977

(22) PCT Filed: Nov. 28, 2014

(86) PCT No.: PCT/EP2014/075948
§ 371 (c)(1),
(2) Date: Jun. 1, 2016

(87) PCT Pub. No.: WO2015/082346
PCT Pub. Date: Jun. 11, 2015

(65) Prior Publication Data
US 2016/0300209 A1 Oct. 13, 2016

(30) Foreign Application Priority Data
Dec. 2, 2013 (EP) .................................. 13195371

(51) Int. Cl.
*G07D 11/13* (2019.01)
*G07D 11/12* (2019.01)
(Continued)

(52) U.S. Cl.
CPC ............. *G06Q 20/18* (2013.01); *G07D 11/12* (2019.01); *G07D 11/125* (2019.01); *G07D 11/13* (2019.01);
(Continued)

(58) Field of Classification Search
CPC ........... G07D 11/0003; G07D 11/0006; G07D 11/0009; G07D 11/0012; G07D 11/0015;
(Continued)

(56) References Cited

U.S. PATENT DOCUMENTS 7,980,461 B1 * 7/2011 Enright .............. G07D 11/0072
235/379
9,141,876 B1 * 9/2015 Jones ....................... G06K 9/60
(Continued)

FOREIGN PATENT DOCUMENTS

DE 20-2006-013486 U1 12/2006
DE 10-2009-009049 A1 10/2009
(Continued)

*Primary Examiner* — Jeffrey A Shapiro
(74) *Attorney, Agent, or Firm* — Black, McCuskey, Souers & Arbaugh, LPA

(57) ABSTRACT

A cash box, an automated teller machine and a data transmission method for transmitting data between an external control unit and a cash box are provided. The cash box is configured for a mechanical and communications-related installation in an automated teller machine. It comprises a storage module which is configured for storing a number of banknotes, an internal control device arranged in the cash box for controlling the cash box, and a transceiver which is coupled to the internal control device and is formed to wirelessly transmit data to a communications interface of an external control unit disposed outside the cash box and receive the data from the same. The transceiver is formed to transmit and receive the data according to the Near-Field-Communication transmission standard.

14 Claims, 3 Drawing Sheets

(51) Int. Cl.
    *G06Q 20/18* (2012.01)
    *G07D 11/23* (2019.01)
    *G07D 11/30* (2019.01)
    *G07D 11/125* (2019.01)
    *H04B 5/00* (2006.01)

(52) U.S. Cl.
    CPC ............. *G07D 11/23* (2019.01); *G07D 11/30* (2019.01); *H04B 5/0037* (2013.01)

(58) Field of Classification Search
    CPC ........... G07D 11/0036; G07D 11/0039; G07D 11/0042; G07D 11/0045; G07D 11/0048; G07D 11/0051; G07D 11/0054; G07D 11/0063; G07D 11/0066; G07D 11/0069; G07D 11/0072; G07D 11/0075; G07D 11/0078; G07D 11/0081; G07D 11/0096; G07D 11/10; G07D 11/12; G07D 11/125; G07D 11/13; G07D 11/135; G07D 11/22; G07D 11/237; G07D 11/225; G07D 11/23; G07D 11/235; G07D 11/24; G07D 11/32; G07D 11/30; G07D 11/34; G07D 11/26; G07D 11/36; G07D 11/28; G07D 11/40
    USPC ................... 194/206, 207; 209/534; 235/379
    See application file for complete search history.

(56) References Cited

U.S. PATENT DOCUMENTS

| | | | | |
|---|---|---|---|---|
| 2004/0169075 A1* | 9/2004 | Washington | ....... | G06Q 20/1085 235/379 |
| 2006/0028341 A1* | 2/2006 | Bartholf | ................. | G07F 19/20 340/570 |
| 2007/0013124 A1 | 1/2007 | Graef et al. | | |
| 2007/0063019 A1 | 3/2007 | Matzig | | |
| 2009/0026907 A1* | 1/2009 | Davidowitz | ..... | G01N 35/00722 312/407 |
| 2009/0224043 A1 | 9/2009 | Leutgeb et al. | | |
| 2011/0238343 A1* | 9/2011 | Kamiya | ............. | G01R 31/3679 702/63 |
| 2012/0154116 A1 | 6/2012 | Duenne et al. | | |
| 2012/0323361 A1 | 12/2012 | Brexel et al. | | |
| 2013/0029595 A1* | 1/2013 | Widmer | ............... | H04B 5/0031 455/39 |
| 2013/0140358 A1* | 6/2013 | Graef | ..................... | G06Q 40/02 235/379 |
| 2013/0244578 A1* | 9/2013 | Bacioccola | ....... | H04M 1/72533 455/41.2 |
| 2013/0288600 A1* | 10/2013 | Kuusilinna | ........... | H02J 7/0004 455/41.2 |
| 2014/0117921 A1* | 5/2014 | Suomela | .............. | H04B 5/0031 320/103 |
| 2014/0144976 A1* | 5/2014 | Angus | ...................... | G07D 7/12 235/375 |
| 2014/0227974 A1* | 8/2014 | Perkins | ................ | G06Q 10/087 455/41.1 |
| 2014/0247004 A1* | 9/2014 | Kari | ........................ | H02J 5/005 320/106 |
| 2014/0339301 A1* | 11/2014 | Angus | .................... | G06Q 40/04 235/379 |
| 2014/0353375 A1* | 12/2014 | Turocy | ................ | G06K 19/073 235/379 |

FOREIGN PATENT DOCUMENTS

DE  10 2008 045 602 A1  3/2010
DE  10-2009-033944 A1  1/2011

* cited by examiner

CASH BOX AND AUTOMATED TELLER MACHINE

CROSS-REFERENCE TO A RELATED APPLICATION

This application is a National Phase patent application of International Patent Application Number PCT/EP2014/075948, filed on Nov. 28, 2014, which claims priority of European Patent Application Number 13195371.3, filed on Dec. 2, 2013.

BACKGROUND

The present invention relates to a cash box, an automated teller machine and to a method for transmitting data between a transceiver of a cash box and an external control unit disposed outside the cash box.

A cash box is known for example from DE 10 2008 045 602 A1. The cash box described there is configured in mechanical and communications terms for installation in an automated teller machine. The cash box, as usual, includes a storage module for storing a number of banknotes. Furthermore, as is likewise usual, there is provided an internal control device arranged in the cash box for controlling the cash box, for example for controlling the output and/or acceptance of banknotes to or from a banknote transport means of the automated teller machine. Finally, the known cash box comprises a transceiver which is coupled to the internal control device and is able to wirelessly transmit data to an external control unit disposed outside the cash box and to receive data from the same. The external control device can be part of the automated teller machine.

DE 10 2008 045 602 A1 on the one hand describes that for this purpose an RFID transponder can be used. The RFID transponder can include a unique identifier which is associated to the cash box. Furthermore it is proposed there to transmit data according to a standard of the infrared Data Association (IrDA).

In this method for transmitting data between a cash box and an external control unit it is disadvantageous, for example, that both IrDA- and RFID-based connections also work over longer connecting routes of e.g. several meters. The safety of such data connection can be impaired thereby. It is possible for example that data concerning the cash box are read out from afar. In particular an infrared-based connection can easily be tapped by an unauthorized third party. In addition, an RFID-based connection is a substantially unilateral connection, which means that data substantially can be transmitted only from the cash box to the external control unit, but not from the external control unit to the cash box. Thus, properties of the cash box, such as an identifier, perhaps can be read via RFID, but it is not possible to control the cash box via RFID. For controlling the cash box an additional IrDA connection would be necessary.

SUMMARY

It therefore is an object underlying the present invention to provide a safe wireless data connection between a cash box and an external control unit disposed outside the cash box. According to a first aspect of the present invention this object is solved by a cash box with the features as described herein. A second aspect of the present invention is formed by an automated teller machine with the features as described herein, and a third aspect of the present invention is formed by the method for transmitting data between a transceiver of a cash box and an external control unit disposed outside the cash box according to the features as described herein.

The present invention includes the finding that in principle a largely wireless coupling of a cash box to the automated teller machine is advantageous, as in this way connectors to be installed with great expenditure, expensive in manufacture and mechanically sensitive can be avoided or saved. In addition, a largely wireless coupling of the cash box to an automated teller machine facilitates the mechanical mounting, as a largely wireless coupling of the cash box to the automated teller machine allows larger tolerances with regard to the position of the cash box.

However, the approaches known from the prior art for wirelessly coupling a cash box to an automated teller machine have the above-mentioned disadvantages, in particular the low safety, which results from the easy tapping of an infrared-based data connection, and due to the fact that both RFID- and infrared-based data connections in principle work over longer connecting routes of e.g. several meters. Thus, the RIFD- and/or IrDA-based data connection might be accessed via remote access. Furthermore it is proposed in the prior art to provide both an RFID- and an IrDA-based coupling, so that two completely different protocols are to be observed, which ultimately results in an expensive hardware and programming of control devices. Furthermore, it is not excluded that an RFID connection and an IrDA connection interfere with each other, in case they are active at the same time.

In contrast thereto, the data connection according to the Near-Field-Communication (hereinafter NFC) transmission standard is universally applicable and significantly safer.

For example, the NFC-based data connection only is usable when the distance between the transceiver and the communications interface of the external control unit is less than several centimeters, such as e.g. 5 cm. Safety already is increased thereby, because for example with proper mechanical installation of the cash box in an automated teller machine an unauthorized access via NFC inevitably fails because of the too large distance between a foreign NFC readout unit and the transceiver of the cash box. To further increase the safety, the data advantageously can be encrypted before being transmitted via NFC, which will be described more exactly at a later point.

In addition, the NFC-based connection can be utilized to read out both status information concerning a status of the cash box and to transmit control data to the cash box, so that processes in the cash box, such as the operation of the storage module, can be controlled by means of the external control unit. Furthermore, it is possible to use the NFC-based data connection between the transceiver of the cash box and the external control unit not only for the bidirectional exchange of data, but in addition also use it as energy path, so that energy can wirelessly be transmitted from the external control unit to the cash box, which energy can then be used in the cash box for charging an energy storage unit and/or for operating one or more components of the internal control device. In so far it is not necessary to employ different communication standards, in order to achieve the largely wireless coupling of cash box and automated teller machine. If in a certain case the energy provided by means of the NFC-based data connection is not sufficient, the NFC data connection optionally is completed by an energy transmission with magnetic coupling according to the transformer principle, which will be described in detail below.

In the following, the components of the cash box according to the invention will be described in detail:

The cash box according to the first aspect of the present invention is configured in mechanical and communications terms for installation in an automated teller machine. For this purpose, the cash box on the one hand includes said transceiver for the wireless exchange of data and on the other hand means, in order to be received by a holding fixture of the automated teller machine, for example grooves into which rails of the holding fixture can engage.

The storage module of the cash box is formed to store a number of banknotes. For example, the banknotes are stored automatically by the storage module, i.e. for example deposited automatically and output automatically. Such processes are controlled for example by the internal control device of the cash box, which for this purpose in turn can receive corresponding commands from the external control unit. For example, the storage module of the cash box stores banknotes of a particular denomination, such as 5 EUR, 10 EUR, 20 EUR, 50 EUR, 100 EUR etc. The cash box for example can hand over a certain number of the stored banknotes to a corresponding banknote transport means of an automated teller machine, so that the automated teller machine can output these banknotes to a user of the automated teller machine. On the other hand, the cash box for example also can take over a number a banknotes from the banknote transport means of the automated teller machine and deposit the same automatically. The cash box according to the invention thus e.g. is an electrically operable cash box for an automated teller machine.

In the cash box, the internal control device for controlling the cash box is arranged. For example, the internal control device controls the storage module and in doing so the input and output of banknotes into and out of the storage module. The internal control device for example is provided with a data memory in which status information on statuses of the cash box, for example with regard to the stock, can be stored. In addition, the internal control device for example is formed to operate an invalidating means for invalidating all banknotes as well as an associated sensor unit, which will be described in detail at a later point.

In one embodiment, the internal control device comprises a programmable control module, for example a microcontroller or a similar programmable control module, such as for example a DSP (Digital Signal Processor), an FPGA (Field-Programmable-Gate-Array) or an ASIC (Application Specific Integrated Circuit) which is programmed corresponding to the control function to be performed by the internal control device.

What is coupled to the internal control device is the transceiver which is formed to wirelessly transmit data according to the NFC transmission standard to the communications interface of the external control unit disposed outside the cash box and to receive data from the same. For this purpose, the transceiver for example includes an NFC antenna for transmitting and receiving NFC-based data and an NFC module for processing the NFC-based data to be transmitted and received. In this case, such NFC module for example is operatively coupled to the internal control device, so that the internal control device can hand over data to the NFC module for the purpose of transmission and can receive data from the NFC module.

The optionally provided NFC module for example is the CR95HF module for the cryptographically unsecured operation and the ST21NFCA module for the cryptographically secured operation of the enterprise STMicroelectronics. In addition to the microcontroller STM32, which is used here for example, a remote Secure Element, for example the module ST33F1, can be used for the cryptographically secured operation.

In connection with the description of the present invention, where reference is made to "NFC" or "Near-Field-Communication", the NFC transmission standard according to NFC ISO/IEC 15693 is meant, for example.

The external control unit is formed to transmit and receive data according to the NFC transmission standard by using its communications interface. The transceiver of the internal control device and the communications interface of the external control unit preferably are compatible with each other.

The transceiver of the cash box e.g. is an NFC transceiver and the communications interface of the external control unit is an NFC communications interface.

The external control unit for example is a control unit installed in the automated teller machine, which also is provided to control the cash box. The external control unit however can also be implemented in a mobile terminal, such as a smartphone, which is provided with an NFC communications interface.

In the present case, the adjective "internal" designates components which are arranged in or at the cash box. In the description of the present invention the adjective "external" designates things/means which are located outside the cash box or are arranged outside the cash box, which shall not exclude however that such means can be arranged in the automated teller machine.

In the following, further embodiments of the cash box according to the invention will be described. The additional features of these further embodiments can be combined with each other to form further design variants, unless they expressly are described as alternative to each other.

In an exemplary embodiment of the cash box the internal control device is formed to provide, for example determine, status information concerning a status of the cash box, such as a storage status like the number and/or the denomination of the stored banknotes. Furthermore, the internal control device e.g. is formed to receive a readout command of the external control unit via the transceiver and upon receipt of the readout command transmit data which are indicative of the status information to the communications interface by means of the transceiver.

Thus, statuses of the cash box can be read out on the one hand and also be set on the other hand in a safe and simple way via NFC. For example, with an NFC-enabled mobile device, such as a tablet or smartphone which contains the external control unit, a service technician can find out in a safe and simple way how many banknotes in what denomination are stored in the storage module of the cash box. As already explained above, the internal control device of the cash box for example monitors such status and updates the status corresponding to the changes. It also is possible to correspondingly program the control device when depositing banknotes.

It may further be provided, however, that the internal control device automatically determines and stores the status of the cash box and upon receipt of the readout command via the transceiver outputs the status information in the form of corresponding data via NFC to the communications interface of the external control unit.

The status information also can be indicative of a next service date, for example for an energy storage unit, or of a date of an activation/deactivation of an invalidation unit for invalidating banknotes, or the like. Furthermore, the status information can provide information on the question with which automated teller machine the cash box is compatible. In addition, the status information can be indicative of the spatial dimensions of the banknotes.

Another specific example for the status information will be presented below: In one embodiment the cash box comprises a number of safety detectors, wherein a respective safety detector is coupled to the internal control device and is formed to detect whether or not the cash box has been opened. For example, the safety detectors are magnetic switches, microswitches and/or piezosensors, which for example can be arranged at a lid or at a slot of the cash box. By means of the safety detectors it can be determined in particular whether or not the cash box has been exposed to an unauthorized interference (attempted manipulation). In one variant the internal control device is formed to query statuses of the number of the safety detectors upon receipt of a readout command and to provide the query result as status information to the external control unit in connection with the NFC-based data transmission.

Due to the fact that status information can be read out via NFC, the cash box need not be provided with corresponding labels or other display means. Furthermore, this embodiment has the advantage that the problem of the allocation of a cash box to a denomination requested by a customer is solved in a random cash box slot. With reference to the status information, the automated teller machine in which the cash box is arranged thus automatically can recognize at which slot of the automated teller machine the cash box is mounted. This means that there is an automatic recognition in which slot the respective cash box with the corresponding denomination is present. For example, when a customer requests a particular amount of money in a particular denomination, the automated teller machine automatically recognizes from the status information of the cash boxes which cash box is to be actuated.

In a further embodiment, the internal control device includes a rewritable data memory which is formed to store received data and/or data to be transmitted. The data to be transmitted for example are indicative of status information. The received data in particular can be indicative of control instructions which the internal control device has to consider when controlling the cash box. For example, a control program which has been transmitted via NFC from the external control unit to the internal control device by means of the communications interface and the transceiver can also be stored on the rewritable data memory.

Furthermore, the cash box i.g. includes a banknote output means which is configured for coupling to a banknote transport means of the automated teller machine and for outputting a particular number of banknotes to the banknote transport means. The internal control device for example is formed to receive a cash output command of the external control unit via the transceiver and upon receipt of the cash output command output the particular number of banknotes to the banknote transport means of the automated teller machine.

Hence, the banknote output means of the cash box i.g. is operatively coupled to the internal control device and configured to be controlled via the same by the external control unit. Furthermore it may be provided that the banknote output means also is configured for depositing a particular number of banknotes. This deposition of a particular number of banknotes also may be controlled by the internal control device. The banknote output processes and banknote deposition processes e.g. are monitored by the internal control device and data concerning the storage status of the cash box are updated automatically.

Accordingly, a complete banknote deposition process and/or a complete banknote output process in the cash box can be controlled from outside by means of NFC.

In another embodiment, the transceiver of the cash box is formed to receive an external high-frequency signal according to the NFC transmission standard and to convert the received high-frequency signal into a first charging current. The transceiver furthermore may be formed to provide the first charging current for the purpose of energy supply, for example directly of the internal control device and/or directly of a sensor unit coupled thereto and/or of an energy storage unit of the cash box. At least a part of the energy supply of the cash box hence for example is provided wirelessly via NFC. For example, via such NFC-based energy supply the energy consumption of one or more sensors arranged in the cash box can be covered.

For example, the transceiver provides the generated first charging current to the optionally provided programmable control module of the internal control device, which for example can be a microcontroller. In one embodiment, an energy storage unit for this purpose is coupled between the transceiver and the programmable control module. For example, the energy storage unit comprises a capacitor, such as a so-called "super capacitor", which temporarily stores the energy provided with the first charging current and, if necessary, provides the same to the programmable control module.

The first charging current for example has a current intensity of 0.3 mA to 6 mA at a voltage of 2 V. Such power in particular is sufficient for the operation of some types of sensor, such as a filling level sensor.

Thus, via the NFC-based coupling of the cash box in the automated teller machine a bidirectional exchange of data can occur on the one hand, and on the other hand a unidirectional transfer of high-frequency power from the automated teller machine to the cash box can be effected. In addition, it is possible to provide the remaining energy supply completely inductively, i.e. wirelessly in the cash box via corresponding transformer means, which will be described in more detail below.

The cash box furthermore for example includes an invalidating means which is formed to invalidate the stored number of banknotes, wherein the internal control device is formed to receive an invalidation command by means of the transceiver and upon receipt of the invalidation command prompt the invalidating means to invalidate the number of banknotes.

The invalidating means for example comprises a dye which the invalidating means upon command spreads over all of the stored banknotes, so that the same are invalidated thereby. However, the present invention is not limited to a particular invalidating means. It rather is essential that the invalidation command preferably is generated by using the NFC technology. It is possible for example that the external control unit transmits an invalidation command via NFC to the transceiver of the cash box. This variant for example is expedient when the automated teller machine in which the cash box can be installed detects that an unauthorized external access (attempted manipulation) to the automated teller machine is effected. In an exemplary variant the transceiver of the cash box as an alternative or in addition to receiving the invalidation command is formed to detect that the distance between the transceiver and the communications interface of the external control unit has exceeded a minimum distance, such as 2 cm, and in reaction to the detection of such exceedance generate the invalidation command and transmit the same to the internal control device, so that the same can prompt the invalidating means to invalidate the number of banknotes. Generating the invalidation command, either by the transceiver itself or by the external control unit, cannot only be based on the detection of the exceedance of the minimum distance, but also on the detection of another irregularity which is indicative of the presence of an unauthorized foreign access. The NFC technology here offers a multitude of different possibilities.

For example, the internal control device of the cash box includes a filling level sensor which is formed to detect a filling level of the invalidating means, the energy accumulator and/or a currently stored amount of banknotes. For example, the filling level sensor provides a filling level signal to the internal control device, which is indicative of a small amount of dye. The internal control device e.g. is formed to transmit this filling level signal or a signal derived therefrom to the external control unit by means of the transceiver via NFC. The external control unit can transmit the received signal together with an identifier, such as a serial number, of the cash box for example to a maintenance center, so that refilling of the invalidating means can be initiated automatically. For example, the filling level sensor is supplied with energy, which is required for its operation, by means of the first charging current.

For example the transceiver is formed to only transmit and receive the data according to the NFC transmission standard, when a distance between the transceiver of the cash box and the communications interface of the external control unit is smaller than a minimum distance, such as several centimeters.

In a further embodiment, the transceiver comprises an NFC tag which is coupled to the internal control device. Such signaling tag facilitates the identification of the cash box as well as the readout of status information. The NFC tag can be part of said data memory or comprise said data memory. In a further embodiment, the data memory comprises an NFC-EEPROM. An identifier (Unique Identifier (UID)) contained therein can be used as identifier of the cash box. For example, the NFC-EEPROM is formed to operate as NFC tag.

The NFC tag for example is encapsulated in the housing of the cash box and thus protected against unauthorized interference.

In one embodiment, the identifier of the cash box comprises a digital signature. For example, this digital signature is durably, in particular non-erasably, loaded into the data memory. For example, the digital signature is generated by means of a conventional asymmetric cryptography and in the manufacturing process of the cash box non-erasably loaded into the data memory. When the external control unit reads the data out of the cash box, the identifier provides for the provability of the authenticity of the cash box by means of the digital signature.

The digital signature, which optionally is part of the identifier, and the provability of the authenticity of the cash box possible therewith will be explained below with reference to an example: For implementing a copy protection, a public key, a private key and an asymmetric algorithm, e.g. an RSA (Rivest, Shamir and Adleman) algorithm, can be sufficient. The pair of keys for example lies centrally on an HSM (High Security Module) and encrypts a random number and a check text. The digital signature for example is formed from the encrypted random number and from the encrypted check text. For example, during the manufacturing process of the cash box the encrypted random number and the check text are non-erasably loaded into the data memory as digital signature. A software of the automated teller machine in which the cash box is to be installed for example contains a public key and the check text. Both is allowed to be known publicly. With the public key the digital signature can be decrypted and compared. It can then be decided whether it is identical with the decrypted check text. If both are identical, it is proven that the cash box originates from a production batch of the authorized manufacturer and is no counterfeit product. The result can only be stored internally, or the operation with this cash box is refused, if it turns out that this is a counterfeit product.

In a further embodiment, the internal control device of the cash box comprises a cryptographic means which is formed to decrypt received data and to encrypt data to be transmitted. In this way, too, the protection against unauthorized access can be increased. The NFC transmission standard advantageously allows to encrypt the data. The cryptographic means also can be implemented in the transceiver.

The cryptographic means may be formed to implement an internal electrical fuse which prevents the readout of data from the data memory or another memory of the internal control device by unauthorized persons. Furthermore, the cryptographic means can include a random number generator, in order to produce one or more keys for the encrypted data transmission. For example, an unambiguous identification number is deposited on the cryptographic means, which for example has been generated non-erasably during a semiconductor production process for manufacturing the cryptographic means.

The cryptographic means for example provides for the fact that at least some of the data deposited in the data memory can be interpreted as digital lock and can only be changed by authenticated users. The authentication mechanism for example is realized on the basis of digital signatures (as they have been explained above) and public-key infrastructures with asymmetrical cryptography in the automated teller machine or in the external control unit which for example is integrated in a mobile terminal. The digital lock can be realized exactly like or similar to the provability of the authenticity of the cash box as set forth above. However, a second private/public key pair can be provided for the implementation of the digital lock.

The aspect of the digital lock will now be explained in detail with reference to an example: The private key for example is stored centrally in an HSM (High Security Module) and the public key is deposited for example in the data memory. The internal control device for example switches a status of the cash box from "available" to "not available", as soon as an attempted manipulation has been inferred. The internal control device stores the status of the cash box in the data memory. The operation of the cash box for which the internal control device indicates the status "not available" is refused by a main control software of the cash box. To reset the status of the data memory from "not available" to "available", at least two possibilities can be employed: a) reset by the external control unit which is part of the automated teller machine, and b) reset by the external control unit which is part of the mobile terminal. Both possibilities can require that a check text and a random number be encrypted by the central HSM. In the case of a) an automated teller machine control software and in the case of b) the mobile terminal it should therefore be possible to request this digital signature from the central HSM. The central HSM for example can ensure that it only processes requests from automated teller machines and mobile terminals which are known to the HWM. The internal control device, which can comprise a microcontroller, can store distinctly larger amounts of data in a non-volatile memory part of the data memory than a conventional NFC tag, which for example can have a memory size of only about 1 KByte. With a larger non-volatile memory of the internal control device it is possible to build up a certificate-based public-key infrastructure which distinctly simplifies the key management.

In another embodiment, the cash box furthermore comprises an internal transformer means which is formed to convert an external electromagnetic field into a second charging current and to supply the same to an energy storage unit of the cash box. The external electromagnetic field need not be based on the use of the NFC technology, but for example can originate from a conventional external transformer means. The external transformer means, which for example is arranged in the automated teller machine, together with the internal transformer means forms a transformer by means of which electric energy can be transmitted, in case the distance between the two transformer means is not more than a few centimeters. Thus, the energy storage unit of the cash box, which for example comprises a battery and/or an accumulator, can be charged. Thus, higher-consumption components of the cash box, such as the storage module and/or the banknote output means, can wirelessly be supplied with energy from outside. As a result, the cash box hence can be installed in an automated teller machine in a particularly simple way, namely almost largely wirelessly, in terms of communications and energy supply.

According to a second aspect of the present invention an automated teller machine is proposed. The automated teller machine of the second aspect of the present invention includes a holding fixture for accommodating a number of cash boxes according to the first aspect of the present invention. Furthermore, the automated teller machine comprises a control unit which is formed to wirelessly transmit data to the transceivers of the cash boxes by means of a communications interface coupled to the control unit and to receive data from the same. According to the invention the control unit of the automated teller machine is formed to transmit and receive data according to the NFC transmission standard by means of the communications interface. The automated teller machine of the second aspect of the present invention shares the advantages of the cash box of the first aspect of the invention. Exemplary embodiments of the automated teller machine analogously correspond to the exemplary embodiments of the cash box, in particular as they are defined in the dependent claims.

In a further embodiment of the automated teller machine the communications interface is compatible to the transceivers of the number of cash boxes. The communications interface and the transceivers hence are adapted to each other. Both may operate according to the NFC transmission standard.

In one embodiment the automated teller machine is formed to accommodate a plurality of cash boxes, for example four cash boxes. The communications interface may include antennas for receiving and transmitting the data, wherein to each antenna one of the number of cash boxes each is associated, i.e. one transceiver each, and the antennas are coupled to the control unit by means of a multiplexer. For receiving and transmitting the data to the cash boxes separate antennas hence are provided. Due to the multiplexer, however, the use of a plurality of separate NFC modules can be omitted, but a single NFC module can process data which are to be transmitted to one or more or all transceivers and can likewise process data which originate from one, more or all transceivers. In this way, hardware can be saved and the power consumption of the automated teller machine can be lowered.

According to a third aspect of the present invention there is proposed a method for transmitting data between a transceiver of a cash box, which is configured in mechanical and communications terms for installation in an automated teller machine, and a communications interface of an external control unit disposed outside the cash box. According to the invention the data are transmitted according to the Near-Field-Communication transmission standard. The method of the third aspect shares the advantages of the cash box of the first aspect of the invention and the advantages of the automated teller machine of the second aspect of the invention. Exemplary embodiments of the method correspond to the exemplary embodiment of the cash box described above and of the automated teller machine described above, in particular as they are defined in the dependent claims.

In a further embodiment, the transmission of data between the external control unit and the internal control device includes an execution of an authentication method. Only after a successful completion of the authentication method, which reveals that the external control unit is authorized to receive data from the cash box and/or to transmit data to the cash box, will data be transmitted and/or received.

BRIEF DESCRIPTION OF THE DRAWINGS

The idea underlying the invention will be explained in detail below with reference to the exemplary embodiments illustrated in the Figures.

DETAILED DESCRIPTION

Figure 1:
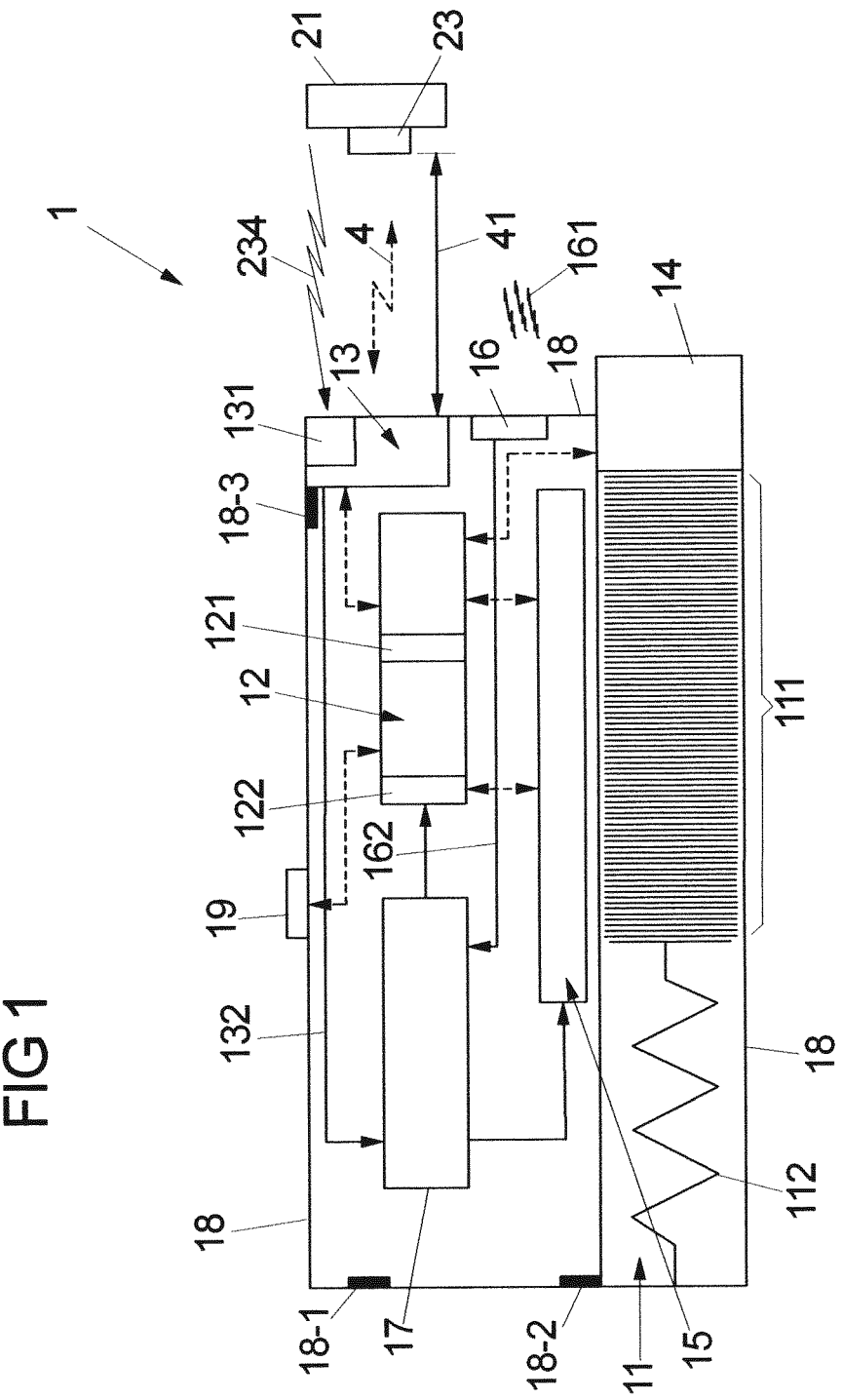
FIG. 1 shows a schematic and exemplary representation of an embodiment of a cash box according to the invention.

FIG. 1 shows a schematic and exemplary representation of an embodiment of a cash box 1 according to the invention.

Figure 2:
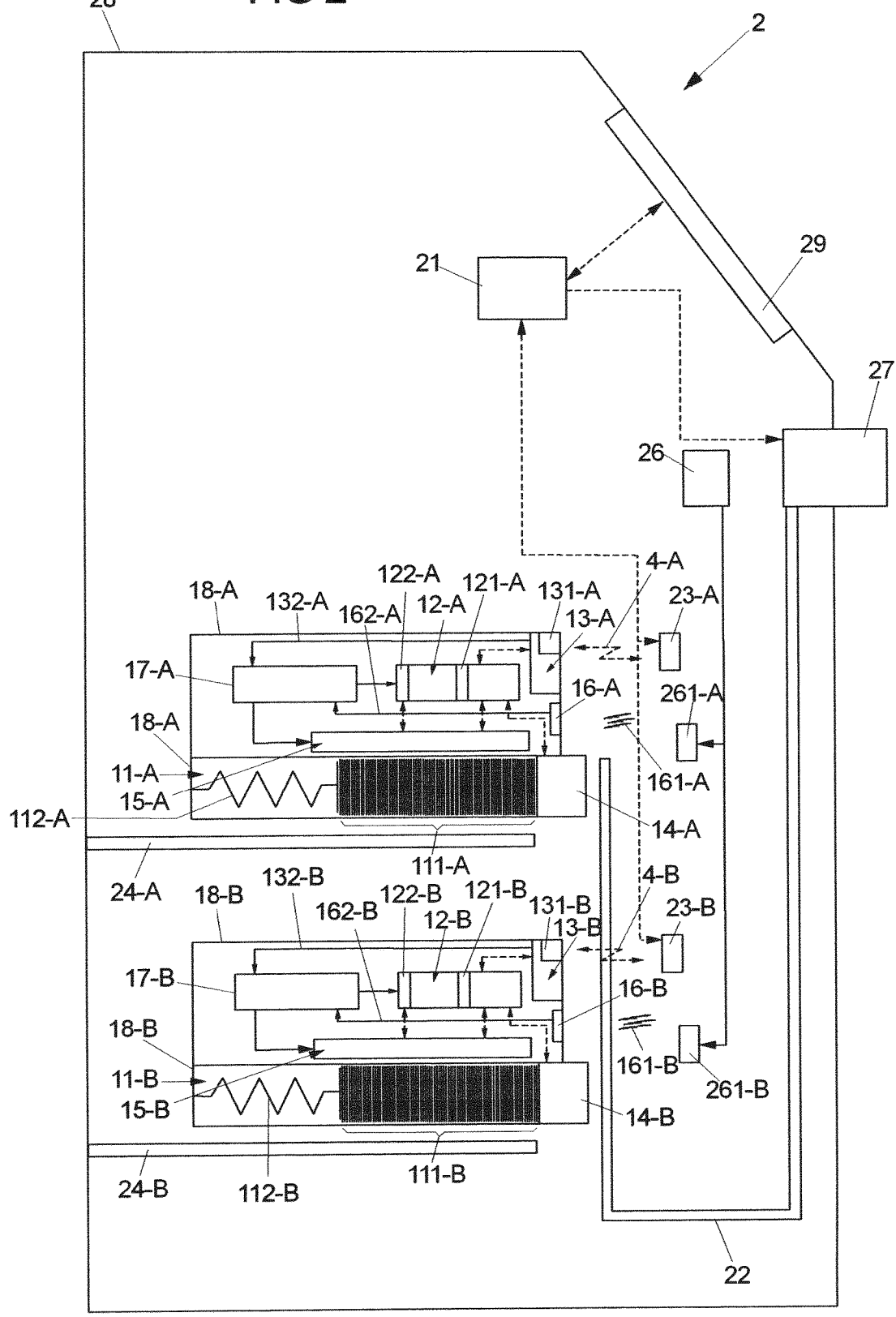
FIG. 2 shows a schematic and exemplary representation of an embodiment of an automated teller machine according to the invention.

The cash box 1 is configured in mechanical and communications terms for installation in an automated teller machine. One embodiment of an automated teller machine 2 according to the invention is shown in FIG. 2 schematically and by way of example.

In the following, the cash box 1 initially will be described in detail, and then the concrete configuration of the exemplary automated teller machine 2 will be discussed. Both Figures will be referred to below. In all FIGS. 1 to 4 paths via which a signal for energy supply, such as an electric current or an electric voltage, is transmitted, are designated with a continuous arrow. Paths via which data, such as control signals, status information and the like are transmitted are designated with dashed arrows.

First of all, the cash box 1 comprises a storage module 11 arranged within a housing 18, which stores a number of banknotes 111. The banknotes 111, which each have a particular denomination and each a corresponding dimension, are stored in the storage module by a holding means 112. Furthermore, the cash box 1 includes a banknote output means 14 which is configured for coupling to a banknote transport means 22 of the automated teller machine 2 (see FIG. 2) and for outputting a particular number of banknotes 111 to the banknote transport means 22. After handing over the particular number of banknotes 111 to the banknote transport means 22, the banknote transport means 22 transports the output banknotes 111 to an input/output means 27 of the automated teller machine 2. The banknote output means 14 likewise can accept banknotes from the banknote transport means 22 and store them in the storage module 11.

For controlling the cash box 1 an internal control device 12 arranged in the cash box 1 is provided. A data memory 121 and a filling level sensor 122 are associated to the internal control device 12. To the internal control device 12 a transceiver 13 is coupled, which wirelessly transmits data 4 to an external control unit 21 disposed outside the cash box 1 and receives data from the same. The external control unit 21 for example is implemented on a mobile terminal 3 schematically and by way of example shown in FIG. 4, and/or in the automated teller machine 2 (see FIG. 2). The external control unit 21 in turn is coupled to a communications interface 23. Via this communications interface 23 the external control unit 21 can transmit data 4 to the transceiver 13 and receive data from the same. Conversely, the transceiver 13 can transmit the data 4 to the communications interface 23 and receive data from the same. The transceiver 13 and the communications interface 23 hence are compatible with each other.

The transceiver 13 transmits the data to the communications interface 23 according to the Near-Field-Communication transmission standard, in the following NFC transmission standard. The communications interface 23 likewise transmits the data 4 to the transceiver 13 according to the NFC transmission standard. An exchange of data 4 between the communications interface 23 and the transceiver 13 only is possible when a distance 41 between the transceiver 13 and the communications interface 23 does not exceed a certain minimum distance. This minimum distance for example is a few centimeters, such as maximally 5 cm or 2 cm.

By means of the communications interface 23, the external control unit 21 can read out status information concerning the cash box 1. This status information for example is indicative of the number of the stored banknotes 111 and/or a denomination of the banknotes 111 and/or a maintenance date and/or for a particular defect in the cash box 1.

The internal control device 12 is formed to provide such status information. For example, the internal control device 12 is formed to deposit the status information in the data memory 121 in the form of data. The status information can be determined by the internal control device 12 itself and/or be provided from outside.

The internal control device 12 for example receives a readout command of the external control unit 21 by means of the transceiver 13 and upon receipt of the readout command of the external control unit 21 provides the status information by means of the transceiver 13. The internal control device 12 hence transmits data 4, which are indicative of the requested status information, according to the NFC transmission standard to the communications interface 23 which is coupled to the external control unit 21.

A specific example for the status information will be presented below: In one embodiment the cash box 1 comprises a number of safety detectors 18-1, 18-2 and 18-3, wherein a respective safety detector 18-1, 18-2 and 18-3 is coupled to the internal control device 12 and is formed to detect whether or not the cash box 1 has been opened. Coupling means for coupling the safety detectors 18-1, 18-2 and 18-3 are not shown in detail in FIG. 1. For example, the safety detectors 18-1, 18-2 and 18-3 are magnetic switches, microswitches and/or piezosensors, which for example can be arranged at a lid or at a slot of the cash box 1, in particular also directly at the internal control device 12 or at the transceiver 13 itself. By means of the safety detectors 18-1, 18-2 and 18-3 it can be determined in particular whether or not the cash box 1 has been exposed to an unauthorized interference (attempted manipulation). In one variant the internal control device 12 is formed to query statuses of the safety detectors 18-1, 18-2 and 18-3 upon receipt of the readout command of the external control unit 13 and to provide the query result as status information to the external control unit 13 in connection with the NFC-based data transmission.

Another specific example for the status information will be presented below: In one embodiment, serial numbers of the banknotes 111 present in the cash box 1 are deposited in the data memory 121. In one variant, the cash box 1 itself is formed to read the serial numbers of banknotes 111 input into the storage module 11 and to deposit them in the data memory 121. In another variant, the serial numbers are deposited in the data memory 121 from outside when the cash box 1 is filled with banknotes 111. The cash box 1 furthermore can be formed to register what serial number a banknote output by the cash box 1 has and to correspondingly update the serial numbers deposited in the data memory 121. In one variant, the status information which the internal control device 12 transmits to the external control device 21 in the form of data 4 contains said serial numbers of the banknotes 111 present in the cash box. The transmission of such information facilitates the determination as to which banknote has been output by which cash box and thus the tracking of particular banknotes, namely in particular when in addition to the serial numbers of the banknotes 111 the identifier of the cash box 1 also is transmitted during the transmission of the data 4 to the external control unit 21, which will be explained in detail below.

For example, the cash box 1 furthermore is equipped with a display 19 which is coupled to the internal control device 12. The internal control device 12 can be formed to provide said query result concerning the statuses of the safety detectors 18-1, 18-2 and 18-3 not only as status information to the external control unit 13 in connection with the NFC-based data transmission, but alternatively or in addition thereto graphically represent this on the display 19. This applies not only for the statuses of the safety detectors 18-1, 18-2 and 18-3, but also for other types of status information explained here by way of example, for instance a status of an energy storage unit 17 which will be described in detail below. For example, it hence is provided that the internal control device 12 is formed to graphically represent the status information on the display 19.

The display 19 preferably is a display which is formed to even display the status information when a power supply of the display 19 is interrupted. In one variant, the display 19 is a segmented display. For example, the display 19 is based on the so-called E-ink technology.

On said data memory 121 not only status information can be stored, but also control programs or the like. Such control programs can be transmitted from outside by means of the external control unit 21. In the data memory 121 a control program for example is stored, according to which the internal control device 12 controls processes in the cash box 1. The data memory 121 for example can be a rewritable data memory.

Via the transceiver 13 not only status information of the cash box 1 can be read out. For example, the internal control device 12 receives a cash output command by means of the transceiver 13, which the external control unit 21 has transmitted according to the NFC transmission standard. Upon receipt of the cash output command, the internal control device 12 controls the banknote output means 14 such that the requested number of banknotes 111 is handed over to the banknote transport means 22 of the automated teller machine 2. After the output of the banknotes 111, the internal control device 12 updates its status in that the status information deposited in the data memory 121 is adapted corresponding to the currently stored number of banknotes 111.

The transceiver 13 furthermore can receive an external high-frequency signal 234, which for example is provided by the external control unit 21 by means of the communications interface 23 or by another unit. The external high-frequency signal 234 also is transmitted to the cash box 1 by the external control unit 21 according to the NFC transmission standard. The transceiver can convert the received high-frequency signal 234 into a first charging current 132, in order to for example supply components of the transceiver 13, such as an NFC tag 131 and/or the filling level sensor 122, with energy. Alternatively or in addition the transceiver 13 supplies the first charging current 132 to an energy storage unit 17 of the cash box 1. This energy storage unit 17 for example can comprise a battery, a capacitor and/or another kind of accumulator as energy accumulator.

A specific example will be described in the following: In one embodiment, the internal control device 12 comprises a programmable control module (not shown in FIG. 1), for example a microcontroller or a similar programmable control module, such as for example a DSP (Digital Signal Processor), an FPGA (Field-Programmable-Gate-Array) or an ASIC (Application Specific Integrated Circuit), in order to be able to fulfill its control function. For example, the transceiver 13 provides the generated first charging current 132 to the optionally provided programmable control module. For these purposes, said energy storage unit 17 is coupled between the transceiver 13 and the programmable control module of the internal control device 12. For example, the energy storage unit 17 comprises a capacitor, such as a so-called "super capacitor", which temporarily stores the energy provided with the first charging current 132 and, if necessary, provides the same to the programmable control module of the internal control device 12.

In one variant, the internal control device 12 is formed to graphically represent a status, for example a charging status, of the energy storage unit 17 on the display 19.

For example, the transceiver 13 comprises said NFC tag 131. Such signaling tag 131 facilitates the identification of the cash box 1 as well as the readout of the status information. The NFC tag 131 can be part of the data memory 121 or comprise said data memory 121. In a preferred embodiment, the data memory 121 comprises an NFC-EEPROM. An identifier (Unique Identifier (UID)) contained therein can be used as identifier of the cash box 1. Preferably, the NFC-EEPROM is formed to operate as NFC tag.

The NFC tag 131 for example is encapsulated in the housing 18 of the cash box 1 and thus protected against unauthorized interference.

In one embodiment, the identifier of the cash box 1 comprises a digital signature. Preferably, this digital signature is durably, in particular non-erasably, loaded into the data memory 121. For example, the digital signature is generated by means of a conventional asymmetric cryptography and in the manufacturing process of the cash box 1 non-erasably loaded into the data memory 121. When the external control unit 21 reads the data 4 out of the cash box 1, the identifier provides for the provability of the authenticity of the cash box 1 by means of the digital signature.

The digital signature, which optionally is part of the identifier, and the provability of the authenticity of the cash box 1 possible therewith will be explained below with reference to an example: For implementing a copy protection, a public key, a private key and an asymmetric algorithm, e.g. an RSA (Rivest, Shamir and Adleman) algorithm, can be sufficient. The pair of keys for example lies centrally on an HSM (High Security Module) and encrypts a random number and a check text. The digital signature for example is formed from the encrypted random number and from the encrypted check text. For example, during the manufacturing process of the cash box 1 the encrypted random number and the check text are non-erasably loaded into the data memory 121 as digital signature. A software of the automated teller machine in which the cash box 1 is to be installed contains a public key and the check text. Both is allowed to be known publicly. With the public key the digital signature can be decrypted and compared. It can then be decided whether it is identical with the decrypted check text. If both are identical, it is proven that the cash box 1 originates from a production batch of the authorized manufacturer and is no counterfeit product. The result can only be stored internally, or the operation with this cash box 1 is refused, if it turns out that this is a counterfeit product.

In one embodiment, the external control unit 21, which—as already mentioned above—can be part of the mobile terminal 3, is equipped with a GPS (Global Positioning System) receiver or a comparable receiver for signals which allow a localization. For example, the external control unit 21 in this variant is formed to forward the data 4 transmitted by the internal control device 12 according to the NFC transmission standard, which in particular can contain said identifier, together with the location data generated by means of the GPS receiver to a central management server (not shown in FIG. 1) largely free from delay, for example via a cellular mobile radio network and/or via a WLAN network. With reference to the forwarded location data and data, the central management server can infer an approximately exact position of the cash box 1, as on the one hand the data 4 have been transmitted via NFC—and hence with a small distance between cash box 1 and external control unit 21 —, and on the other hand the external control unit 21 has forwarded the transmitted data largely free from delay—i.e. without essential change in position of the external control unit 21—to the central management server. The data 4 and the location data can however also be forwarded with delay, when the external control unit 21 registers the current location of the external control unit 21 upon receipt of the transmitted data 4.

The central management server, which can be a server connected to the internet, can utilize the forwarded data together with the location data for example to perform a tracking, i.e. a local tracking, of the cash box 1. Tracking for example is effected by transmitting the identifier of the cash box 1 to the central management server when the cash box 1 is filled with banknotes 111.

During filling, a corresponding data structure for example is allocated to the cash box 1 in a database of the central management server. Due to the query with the external control unit 21, this data structure can be filled with said location data as soon as a connection between the external control unit 21 and the transceiver 13 is established. A transport process for example can prescribe that the cash box 1 must be queried by the external control unit 21 within a prescribed time interval at a particular position. When this query is not made, or when time and place of the query do not correspond with the indications of the transport process, a manipulation of the cash box 1 can be inferred. An automated teller machine in which the cash box 1 is to be installed can be programmed correspondingly and refuse the acceptance of this cash box 1.

The data 4 optionally can be transmitted in encrypted form between the transceiver 13 and the communications interface 23. For this purpose the cash box 1 comprises a cryptographic means not shown in FIG. 1, in order to encrypt data 4 to be transmitted and to decrypt received data 4.

The cash box 1 furthermore comprises an invalidating means 15, which is formed to invalidate the stored number of banknotes 111. By means of the transceiver 13 the internal control device for example receives an invalidation command from the external control unit 21 and upon receipt of the invalidation command prompts the invalidating means 15 to invalidate the number of banknotes 111. This for example can be accomplished in that the invalidating means 15 spreads a dye over all banknotes 111, so that the same are invalidated. For monitoring a filling level of the dye contained in the invalidating means 15 the filling level sensor 122 is provided, which for example communicates a low dye filling level to the control device 12. A low dye filling level for example can be stored in the data memory 121 as status information and during a subsequent readout operation be communicated to the external control unit 21. In this way it can be ensured that the cash box 1 always comprises an invalidating means with sufficient dye.

It has already been explained above that a part of the energy supply can be coupled into the cash box from outside by means of the high-frequency signal 234. This external high-frequency signal 234 also, i.e. like the data 4, is transmitted to the cash box 1 according to the NFC transmission standard. The power of such NFC-based high-frequency signal however is limited, so that possibly not all components of the cash box 1 can be supplied with energy by means of this signal 234. The cash box 1 therefore comprises an internal transformer means 16 which converts an external electromagnetic field 161 into a second charging current 162 and supplies it to the energy storage unit 17 of the cash box. For example, this external electromagnetic field 161 is provided by an external transformer means. Such external transformer means is schematically shown in FIG. 2 and designated with the reference numeral 261. In this way, the cash box 1 can be coupled line-free, i.e. wirelessly, in the automated teller machine 2 both in terms of communications and in terms of energy supply.

Figure 3:
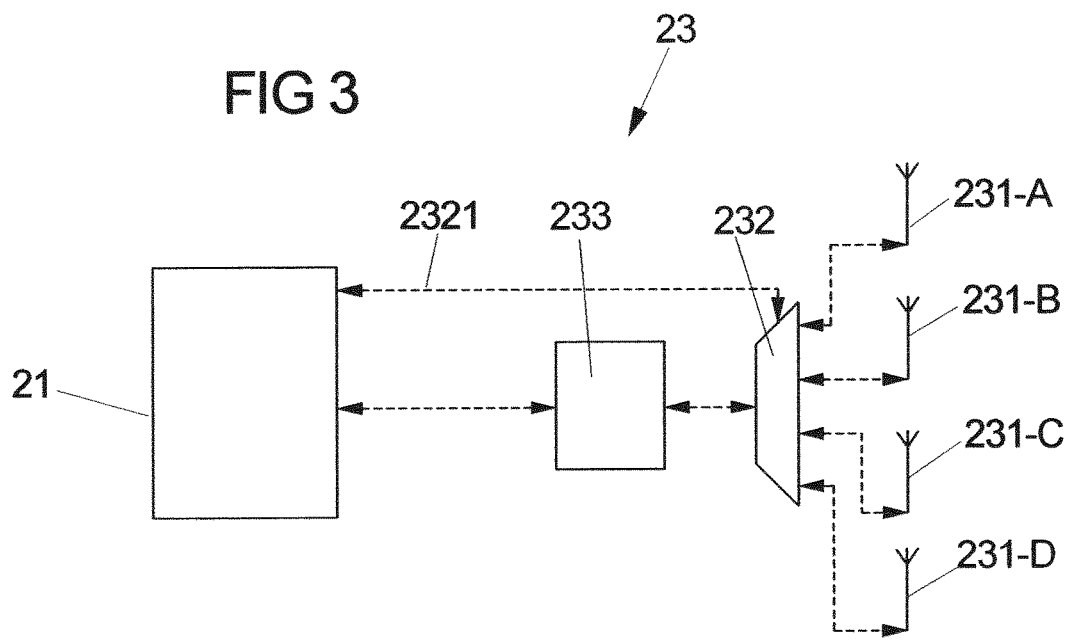
FIG. 3 shows a schematic and exemplary representation of a communications interface which is coupled to an external control unit.

Now, the automated teller machine 2 will be described in detail with reference to FIGS. 2 and 3: The automated teller machine 2 includes a housing 28. In FIG. 2 paths via which energy signals, such as an electric voltage or an electric current, are transmitted also are designated with continuous arrows, and paths via which data, such as control signals, status information and the like are transmitted between the components are designated with dashed arrows.

The automated teller machine 2 is formed to accommodate several cash boxes 1-A and 1-B. The cash boxes 1-A and 1-B each have a construction which substantially corresponds to the construction of the cash box 1 shown in FIG. 1. For accommodating the cash boxes 1-A and 1-B the automated teller machine 2 includes holding means 24-A and 24-B. In FIG. 2 these holding means 24-A and 24-B are only shown schematically. These can be rails, for example, on which a respective cash box 1-A and 1-B can be placed and be pushed into the automated teller machine 2. The exact configuration of the holding means 24-A and 24-B is less important here.

In terms of energy supply and communications, the cash boxes 1-A and 1-B are coupled to corresponding components 23-A, 23-B, 261-A and 261-B of the automated teller machine 2 completely wirelessly due to the transceivers 13-A and 13-B and the internal transformer means 16-A and 16-B. This facilitates the installation of the cash boxes 1-A and 1-B in the automated teller machine 2. For outputting banknotes 111-A (for example banknotes of a first denomination) and banknotes 111-B (for example banknotes of a second denomination different from the first one) said banknote transport means 22 is provided in the automated teller machine 2, which couples the banknote output means 14-A and 14-B of the cash boxes 1-A and 1-B to the input-output means 27 of the automated teller machine 2.

For the input and output of banknotes the automated teller machine 2 receives corresponding user commands for example via a user interface 29. A control unit 21 receives these user commands and processes the same correspondingly. For example, the control unit 21 transmits banknote output commands to the transceivers 13-A and 13-B by means of the communications interface 23-A and 23-B provided for this purpose in dependence on the received user commands. As explained already, this wireless transmission of data is effected according to the NFC transmission standard. The cash boxes 1-A and 1-B in turn provide the received banknote output command to the internal control devices 12-A and 12-B by means of the transceivers 13-A and 13-B, respectively. The internal control devices 12-A and 12-B then control the banknote output means 14-A and 14-B such that the requested amount of banknotes 111-A and 111-B is handed over to the banknote transport means 22, which consequently transmits the banknotes handed over to the input-output means 27. When depositing banknotes, an analogous procedure is applied.

To supply the cash boxes 1-A and 1-B with energy, the automated teller machine 2 includes a power supply 26. This power supply is coupled to transformer means 261-A and 261-B. These transformer means 261-A and 261-B are arranged externally with respect to the cash boxes 1-A and 1-B, namely such that together with the internal transformer means 16-A and 16-B they form a transformer, so that the internal transformer means 16-A and 16-B can receive electromagnetic fields 161-A and 161-B provided by the external transformer means 261-A and 261-B and convert the same into corresponding second charging currents 162-A and 162-B. For example, the external transformer means 261-A and 261-B form a respective primary side and the internal transformer means 16-A and 16-B form a respective secondary side of the transformer formed by the respective two transformer means 16-A and 261-A or 16-B and 261-B.

With respect to FIG. 3, the construction of a communications interface 23 of the external control unit 21 subsequently will be explained in detail. Initially, FIG. 3 schematically shows the control unit 21 of the automated teller machine 2. To transmit the data to the cash boxes 1-A and 1-B and possibly to further cash boxes according to the NFC transmission standard, antennas 231-A, 231-B, 231-C and 231-D are provided, i.e. a total of four antennas for the transmission of data to a total of four cash boxes. However, there might also be provided more or less cash boxes, i.e. also more or less antennas. In any case, each antenna 231-A to 231-D is associated to one cash box each. For example, the cash box 1-A is associated to the antenna 231-A and the cash box 1-B to the antenna 231-B etc. All antennas are coupled to the control unit 21 by means of a multiplexer 232. For processing the received data, which have been transmitted to the antennas 231-A to 231-D according to the NFC transmission standard, an NFC module 233 is provided. This NFC module converts the received data into a form which is readable for the control unit 21. Conversely, the NFC module 233 converts the data to be transmitted, which the NFC module 233 has received from the control unit 21, into NFC data which by means of the multiplexer 232 are then transmitted to one or more of the antennas 231-A to 231-D which then transmit the same to the corresponding antennas of the transceivers of the cash boxes. The multiplexer 232 is controlled by the control unit 21 by means of a multiplexer control signal 2321.

Due to the use of the multiplexer 232, the number of NFC modules to be used can be reduced. As is schematically illustrated in FIG. 3, merely one NFC module 233 is required for operating four antennas 231-A to 231-D, i.e. for controlling four cash boxes. In this way, costs can be saved and the entire energy consumption of the automated teller machine 2 can be reduced.

Figure 4:
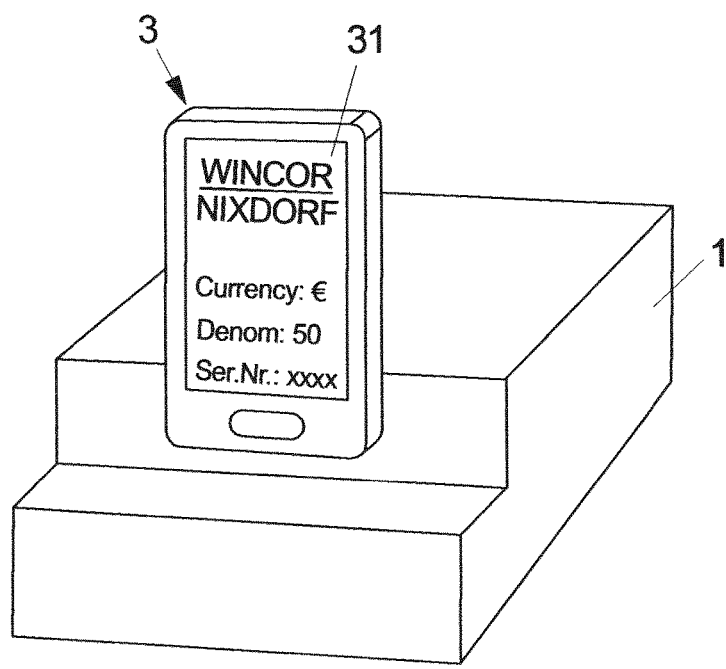
FIG. 4 shows a schematic and exemplary representation of an external control unit in the form of a mobile terminal which exchanges data with a cash box according to the NFC transmission standard.

Finally, FIG. 4 schematically shows the cash box 1 which by using the NFC transmission standard communicates with an external control unit 3 in the form of a mobile terminal, such as a smartphone. Many of the smartphones commonly used today are provided with means to exchange data according to the NFC transmission standard. On the mobile terminal 3 a simple app can be programmed, which allows a communication with the cash box 1, but at least a readout of status information. It thus is possible to read out a status of the cash box 1 by means of the mobile terminal 3 and to let it be displayed on a display means 31 of the mobile terminal. In the illustrated example the cash box 1 stores banknotes (not shown in FIG. 4) of the currency EURO and the denomination 50. Furthermore, the serial number of the cash box 1 is displayed. As mentioned, the serial number can be identical with the identification number of the NFC tag, which is provided as part of the transceiver in the cash box 1.

LIST OF REFERENCE NUMERALS 1, 1-A, 1-B cash box
11, 11-A, 11-B storage module
111, 111-A, 111-B banknotes
112, 112-A, 112-B holding means
12, 12-A, 12-B internal control device
121, 121-A, 121-B data memory
122, 122-A, 122-B filling level sensor
13, 13-A, 13-B NFC transceiver
131, 131-A, 131-B NFC tag
132, 132-A, 132-B first charging current
14, 14-A, 14-B banknote output means
15, 15-A, 15-B invalidating means
16, 16-A, 16-B internal transformer means
161, 161-A, 161-B external electromagnetic field
162, 162-A, 162-B second charging current
17, 17-A, 17-B energy storage unit
18, 18-A, 18-B housing of the cash box
18-1, 18-2, 18-3 safety detectors
19 display
2 automated teller machine
21 control unit
22 banknote transport means
23, 23-A, 23-B NFC communications interface
231-A, 231-B, 231-C, 231-D antennas
232 multiplexer
2321 multiplexer control signal
233 NFC chip
24-A, 24-B holding fixture
26 power supply
261-A, 261-B external transformer means
27 input-output means
28 housing of the automated teller machine
29 user interface
3 mobile terminal
31 display means
4, 4-A, 4-B data
41 distance

The invention claimed is:

1. A cash box which in mechanical and communication terms is configured for installation in and automated teller machine, comprising
a storage module which is configured for storing a number of banknotes,
an internal control device arranged in the cash box for controlling the cash box, and
a transceiver which is coupled to the internal control device and is formed to wirelessly transmit data to a communications interface of an external control unit disposed outside the cash box and to receive data from the same,
wherein the transceiver is formed to:
transmit and receive the data according to the Near-Field-Communication transmission standard;
receive an external high-frequency signal according to the Near-Field-Communication transmission standard;
convert the received high-frequency signal into a first charging current; and
provide the first charging current for energy supply; and
wherein the cash box further includes an internal transformer means which is formed to convert an external electromagnetic field into a second charging current and to supply the same to an energy storage unit of the cash box,
wherein the external electromagnetic field that is converted into a second charging current is not according to the Near-Field-Communication transmission standard, and
wherein the internal control device includes a filling level sensor which is formed to detect a filling level of the energy storage unit, a current amount of banknotes stored in the cash box or a filling level of an invalidating means of the cash box, and
wherein the internal control device comprises a rewritable data memory which is formed to store received data or data to be transmitted, and
wherein the internal control device can be programmed via a communications interface of the automated teller machine when the storage module is disposed in the automated teller machine and the internal control device can be programmed via a mobile terminal when the storage module is disposed out of the automated teller machine.

2. The cash box according to claim 1, wherein the internal control device is formed to provide status information concerning a status of the cash box, and receive a readout command of the external control unit via the transceiver and upon receipt of the readout command transmit data, which are indicative of the status information, to the communications interface by means of the transceiver.

3. The cash box according to claim 2, wherein the status information concerning the status of the cash box comprises the number of or a denomination of the stored banknotes.

4. The cash box according to claim 1, wherein on the rewritable data memory a digital signature is deposited and the internal control device is formed to transmit data, which contain the digital signature, by means of the transceiver to the external control unit.

5. The cash box according to claim 1, wherein the cash box furthermore comprises a banknote output means which is configured for coupling to a banknote transport means of the automated teller machine and for outputting a particular number of the banknotes to the banknote transport means, wherein the internal control device is formed to receive a cash output command of the external control unit via the transceiver and upon receipt of the cash output command output the particular number of the banknotes to the banknote transport means of the automated teller machine.

6. The cash box according to claim 1, wherein the internal control device comprises a cryptographic means which is formed to decrypt received data and to encrypt data to be transmitted.

7. The cash box according to claim 1, wherein the cash box furthermore includes the invalidating means which is formed to invalidate the stored number of banknotes, wherein the internal control device is formed to receive an invalidation command by means of the transceiver and upon receipt of the invalidation command prompt the invalidating means to invalidate the number of banknotes.

8. The cash box according to claim 1, wherein the transceiver is formed to only transmit and receive the data according to the Near-Field-Communication transmission standard where a distance between the transceiver of the cash box and the communications interface of the external control unit is less than five centimeters.

9. The cash box according to claim 1, wherein the transceiver comprises a Near-Field-Communication tag.

10. The cash box according to claim 9, wherein the Near-Field-Communication tag is encapsulated in a housing of the cash box.

11. An automated teller machine, comprising a holding fixture for accommodating a number of cash boxes according to claim 1 and a control unit which is formed to wirelessly transmit data to the transceiver of the cash boxes and receive the data from the same by means of a communications interface of the automated teller machine coupled to the control unit, wherein the control unit of the automated teller machine is formed to transmit and receive the data by means of the communications interface according to the Near-Field-Communication transmission standard.

12. The automated teller machine according to claim 11, wherein the communications interface is compatible to the transceivers of the number of cash boxes.

13. The automated teller machine according to claim 11, wherein the communications interface includes antennas for transmitting and receiving the data, wherein to each antenna one of the number of cash boxes each is associated and the antennas are coupled to the control unit by means of a multiplexer.

14. The cash box according to claim 1, wherein the transceiver is formed to only transmit and receive the data according to the Near-Field-Communication transmission standard where a distance between the transceiver of the cash box and the communications interface of the external control unit is less than two centimeters.

* * * * *